Patented Apr. 24, 1951

2,549,940

UNITED STATES PATENT OFFICE 2,549,940

TITANATION OF POLYVINYL RESINS

Frank Kerr Signaigo, Kenmore, N. Y., assignor to E. I. du Pont de Nemours & Company, Wilmington, Del., a corporation of Delaware No Drawing. Application August 22, 1946, Serial No. 692,381

4 Claims. (Cl. 260—89.1)

This invention relates to new chemical products and to novel processes for their production. More particularly, it relates to the manufacture of improved, modified forms of polyvinyl ester and polyvinyl acetal compositions.

Polyvinyl acetate is widely used as an adhesive and as an impregnant for fibrous materials, such as paper and fabrics. However, because of its low softening point, high solubility, and relatively low strength, it has limited utility in many applications, including surface coating, plastics, and adhesives.

It is among the objects of this invention to overcome these and other deficiencies which characterize prior forms of polyvinyl ester and polyvinyl acetal compositions, and to provide in particular a novel and efficient means for increasing the usefulness of polyvinyl acetate by modifying its properties. Another object is to provide new and improved polyvinyl acetate adhesives and coatings, as well as to provide novel processes for obtaining a new and useful class of polymeric materials derived from polyvinyl esters and polyvinyl acetals. Other objects and advantages of the invention will be evident from the ensuing description thereof.

These objects are accomplished in this invention which comprises titanating a polyvinyl compound from the group consisting of an ester and acetal by contacting the same with a reactive form of a titanium compound.

In a more specific and preferred embodiment, the invention comprises titanating polyvinyl acetate by reacting the same at an elevated temperature with a water-soluble compound of tetravalent titanium. In accordance with one adaptation of the invention, it has been discovered that when a polyvinyl ester, particularly a polyvinyl acetate emulsion, is treated with an active titanium compound, such as titanyl sulfate, titanium lactate, freshly-precipitated, uncalcined, hydrous titanium dioxide, titanic acid, and pertitanic acid, the titanated products so obtained are considerably improved with respect to softening points, water sensitivity, and tensile strength. Such titanation can be conveniently carried out by incorporating the titanium compound into an emulsion of the polyvinyl ester (preferably polyvinyl acetate), or an acetal, and then applying the resulting emulsion or titanated compound to the surfaces to be coated or bonded, followed by baking, in the latter instance, at an elevated temperature and suitable pressure, the coated or bonded material.

The invention is useful in providing new and improved adhesive, coating, or plastics compositions from polyvinyl carboxylates and acetals, which are characterized by having increased softening points, and relatively high degrees of water resistance. In the field of adhesives, the products of the invention are particularly effective for the bonding of plywood, paper and cloth laminates, and for heat sealing adhesives for paper, regenerated cellulose, and other cellulosic products. They also have particularly effective applications in the sizing and impregnation of paper and textile fibers; unsupported films; and molding plastics.

To a clearer understanding of the invention, the following specific examples are given. These are merely illustrative and not to be taken as in limitation of the invention:

Example I

Polyvinyl acetate films, cast from 10% solutions of 50% hydrolyzed polyvinyl acetate, are treated for about 15 minutes at 60° C. in a bath of aqueous titanyl sulfate solution containing the equivalent of 7% by weight of $TiO_2$, rinsed in dilute ammonia solution and are then washed free from sulfate with water. The resulting titanated polyvinyl acetate films contain appreciable amounts of titanium, are transparent and tough when dried, have much lower moisture absorption properties than untreated films, and retain their strength and elasticity after prolonged exposure in water at room temperature.

Similar titanated films cast on glass or polymethyl methacrylate sheets and treated with titanyl sulfate as described above, showed better adhesion to these surfaces than untitanated films. When treated in boiling water, the polyvinyl acetate-titanate coatings could be stripped from the glass or polymethyl methacrylate bases to give tough, insoluble unsupported films.

Example II

An adhesive mixture was prepared by mixing 30 parts of polyvinyl acetate emulsion (55% solids), and 13.6 parts of titanyl sulfate solution containing the equivalent of 12% by weight of $TiO_2$, and 1.2 parts of calcium oxide. The resulting paste was then used for bonding laminated wood veneers by coating birchwood veneers with the adhesive mixture and bonding them together by pressing at 200 pounds per square inch, at 130–35° C., for 15 minutes. Strong dry bonds were thereby obtained which showed no tendency to delaminate after more than four hours' treatment in boiling water. Break tests on samples boiled for four hours showed wood failure but no bond failure.

By comparison, control plywood bonds made with unmodified polyvinyl acetate emulsion delaminated completely and broke on testing after treatment for ten minutes in boiling water.

*Example III*

An adhesive paste consisting of a mixture of a 55% polyvinyl acetate emulsion, and freshly precipitated titanium hydroxide was prepared in the following manner:

To 100 parts of a 55% polyvinyl acetate emulsion was added with stirring 67 parts of an aqueous solution of titanyl sulfate equivalent to 15% by weight of $TiO_2$, and 33 parts of a 30% NaOH solution. The pasty mixture was then thinned by the addition of 130 parts of water.

The mixture so obtained was used for bonding laminated wood veneers by applying a thin priming coat of the adhesive and allowing to air-dry for a few minutes, then coating a second time and hot pressing the laminated veneers at 140–150° C. under 200 lbs./sq. in. pressure for 20 minutes. Strong dry bonds were thus obtained which resisted delamination in boiling water for at least one hour, and which showed no signs of delamination in water at ordinary temperatures up to periods of seven days.

Under similar conditions, control panels bonded with unmodified polyvinyl acetate adhesive delaminated in 10 minutes in boiling water, and in 4 days in water at room temperature.

*Example IV*

Hydrous $TiO_2$ corresponding in composition to ortho-titanic acid ($H_4TiO_4$) was prepared in a particularly active form in the following manner:

Two hundred thirty seven parts of titanium tetrachloride was dissolved in 887 parts of distilled water at about 20° C. Approximately 440 parts of a 28% solution of ammonia is then added with cooling (about 20° C.) to bring the resulting slurry to a pH of 6.5–7.0. The precipitate so formed was filtered and washed free from chlorides, and finally washed successively with anhydrous alcohol and ether, and dried in vacuo at 30–50° C.

An adhesive paste consisting of 36 parts of a 55% polyvinyl acetate emulsion mixed with 2 parts of the hydrous $TiO_2$ powder, prepared as described above, when coated on glass and dried at 100° C., yielded a tough, insoluble film which adhered to the glass even in boiling water. By comparison, emulsions of untitanated polyvinyl acetate yielded films which disintegrated easily when subjected to boiling water treatment.

Laminated plywoods bonded with the titanated polyvinyl acetate emulsion described above, under 200 lbs./sq. in. pressure at 140° C. for 20 minutes, yielded strong laminated bonds which resisted delamination even when subjected to boiling water treatment for a period of 30 minutes.

*Example V*

An adhesive paste consisting of 30 parts of 55% polyvinyl acetate emulsion homogenized with 3.5 parts of titanium lactate and 7 parts of water was used for bonding plywood veneers at 140° C., under 250 lbs./sq. in. pressure for 20 minutes. Strong dry bonds were obtained which resisted delamination even when subjected to 25 minutes' boiling water treatment. Controls bonded with untreated polyvinyl acetate emulsion delaminated within 10 minutes' treatment in boiling water.

The foregoing examples illustrate certain aspects of my invention but it is to be understood that the invention is not limited thereto. Obviously the invention is capable of being adapted to many widely different embodiments without departing from its underlying spirit and scope.

Instead of polyvinyl acetate, other vinyl polymer substances may be employed and in an analogous manner, including partially-hydrolyzed polyvinyl esters, such as polyvinyl propionate, polyvinyl butyrate, polyvinyl valerate, polyvinyl formate, etc. Similarly, in lieu of a polyvinyl ester, polyvinyl acetals obtained by condensing a polyvinyl alcohol with an aldehyde, particularly formaldehyde, acetaldehyde, and N-butaldehyde, etc., can be used. Examples of employable acetals include polyvinyl acetal, polyvinyl butyral, polyvinyl formal, polyvinyl propional, polyvinyl valeral, etc. Likewise, the mixed ester-ether compounds of these vinyl polymer substances are embraced within the invention.

Similarly, although certain specific active titanium compounds have already been mentioned as utilizable herein, any hydrous (non-pigmentary) or water-soluble, inorganic or organic titanium compound which is reactive towards the vinyl polymer under the conditions, including titanyl sulfate, titanium lactate, titanium tetrachloride, titanium nitrate, freshly-precipitated titanium hydroxide, ortho-, and meta-titanic acids, pertitanic acid, titanium acetate, titanium oxylate, titanium glycolate and hydrous, uncalcined $TiO_2$, etc., can be used.

The amount of titanium compound used can be varied over fairly wide limits, but in general is relatively small or minor. The optimum amount will be governed to a considerable degree by the type and composition of the resin to be titanated, as well as the type and character of the titanium compound employed in the titanation. In general, good results are obtained by employing titanium compounds in concentrations corresponding to as low as about 1% and up to about 40% of $TiO_2$ based on the weight of solid polyvinyl compounds treated. A preferred, most useful $TiO_2$ concentration ranges from about 7% to 15% by weight.

The minimum temperature required to effect curing and setting of the modified vinyl resins is also variable and will depend on the activity of the titanium compound used, the curing time resorted to, and the pressure employed. Thus, temperatures ranging from 20° C. to 200° C. can be utilized in the invention. Preferably, temperatures ranging from 130° C. to 150° C. are resorted to, since they have been found to provide optimum results for curing and setting the titanated polyvinyl acetate adhesives and coatings herein contemplated.

I claim as my invention:

1. A method for producing titanated polyvinyl acetate which comprises forming an aqueous emulsion of partially, up-to-50% hydrolyzed polyvinyl acetate, incorporating in said emulsion an aqueous solution of a water-soluble titanium compound containing from 7% to 15% of $TiO_2$ based on the weight of said acetate, curing and setting the resulting mixture at temperatures ranging from 20° C. to 200° C.

2. A method for producing an improved vinyl polymer composition which comprises titanating at 50%-hydrolyzed polyvinyl acetate in an aqueous solution by incorporating said acetate in an aqueous titanyl sulfate solution containing from 7% to 15% of $TiO_2$, based on the weight of said acetate, and curing and setting the resulting titanated product at temperatures ranging from 20–200° C.

3. A method for producing an improved heat-convertible vinyl polymer composition which comprises mixing a partially, up-to-50%-hydrolyzed polymeric vinyl ester of a monocarboxylic acid with an aqueous solution of a reactive, water-soluble titanium compound, the $TiO_2$ concentration of which titanium compound ranges from about 7–15% by weight, based on the weight of the ester, and curing and setting the resulting product at temperatures ranging from 20–200° C.

4. A method for producing an improved heat-convertible vinyl polymer composition which comprises incorporating an aqueous emulsion of a partially, up-to-50%-hydrolyzed polymeric vinyl ester of a monocarboxylic acid in an aqueous solution of a water-soluble titanium salt containing from about 7% to 15% of $TiO_2$, based on the weight of said ester, and curing and setting the resulting product at temperatures ranging from about 130–150° C.

FRANK KERR SIGNAIGO.

REFERENCES CITED

The following references are of record in the file of this patent:

UNITED STATES PATENTS

| Number | Name | Date |
|---|---|---|
| 2,056,796 | Macht et al. | Oct. 6, 1936 |
| 2,258,718 | Rothrock | Oct. 14, 1941 |
| 2,334,358 | Smith | Nov. 16, 1943 |
| 2,364,790 | Hemming | Dec. 12, 1944 |

OTHER REFERENCES

Elod et al.: Stiasny Festchr. (1937), pp. 41–52 as reported in Chem. Abstr., vol. 32, column 7763 (1938).